United States Patent
Halamik et al.

(10) Patent No.: US 6,208,538 B1
(45) Date of Patent: Mar. 27, 2001

(54) PWM CONTROL APPARATUS

(75) Inventors: Josef Halamik, Roznov (CZ); Francois L'Hermite, Lasserre; Joel Turchi, Toulouse, both of (FR)

(73) Assignee: Semiconductor Components Industries, LLC, Phoenix, AZ (US)

( * ) Notice: Subject to any disclaimer, the term of this patent is extended or adjusted under 35 U.S.C. 154(b) by 0 days.

(21) Appl. No.: 09/585,131

(22) Filed: Jun. 1, 2000

(30) Foreign Application Priority Data

Jun. 1, 1999 (EP) .................................................. 99401317

(51) Int. Cl.$^7$ .................................................. H02M 3/335
(52) U.S. Cl. .................................. 363/41; 363/21; 363/97
(58) Field of Search .................................. 363/21, 40, 41, 363/95, 97, 131; 307/64, 65, 66

(56) References Cited

U.S. PATENT DOCUMENTS

| | | | |
|---|---|---|---|
| 4,994,719 | * 2/1991 | Lendaro | 315/411 |
| 5,017,844 | * 5/1991 | Lendaro | 315/408 |
| 5,351,177 | * 9/1994 | Megeid | 363/21 |
| 5,465,011 | * 11/1995 | Miller et al. | 307/64 |
| 5,689,407 | 11/1997 | Marinus et al. . | |
| 5,764,461 | * 6/1998 | Wu | 361/18 |
| 5,812,383 | 9/1998 | Mobers et al. . | |
| 6,005,789 | * 12/1999 | Lee | 363/95 |

OTHER PUBLICATIONS

Philips Semiconductors: Greenchip SMPS module TEA1566, Data Sheet, Apr. 20, 1999 (199–04–20) XP002122143 pp 1–23.

Motorola: Greenline very high voltage PWM Controller, Data Sheet, Jul. 1999 (199–07), XP002122144 pp 1–15.

* cited by examiner

*Primary Examiner*—Adolf Deneke Berhane
(74) *Attorney, Agent, or Firm*—Robert D. Atkins; Michael T. Wallace

(57) ABSTRACT

A Pulse Width Modulation (PWM) control circuit is used in a switched-mode power supply (SMPS) having a normal mode and a standby mode, for controlling and regulating the SMPS. An input of the PWM control circuit is arranged to receive a signal indicating an amount of current supplied by the supply. An over-current determining arrangement provides an over-current signal in the event of there being an over-current condition in the signal indicating the amount of current supplied by the supply. A further input of the PWM control circuit receives a regulation signal in the event of there being a regulation output from circuitry coupled to receive power from the SMPS. A logic circuit within the PWM control circuit compares the over-current signal and the regulation signal in order to determine whether the switched-mode power supply is in standby mode or normal mode, thus avoiding the need for a dedicated control pin to indicate standby and normal modes.

7 Claims, 3 Drawing Sheets

US 6,208,538 B1

PWM CONTROL APPARATUS

FIELD OF THE INVENTION

This invention relates to pulse-width modulated control apparatus, and particularly but not exclusively for such apparatus when used to control a switched-mode power supply.

BACKGROUND OF THE INVENTION

Switched-Mode Power Supplies (SMPS) are being increasingly used in many domestic and industrial applications. In applications such as televisions or computer monitors, the application may require a number of states or modes of operation. A first 'off' mode occurs when there is no power supplied to a device (or when a master switch is off); a second 'on' mode occurs when the device is switched to an operating normally; and a third mode (referred to as a standby mode) occurs when the device is to remain powered, but with reduced functions and reduced power consumption. A standby mode may be encountered in a television via an 'off' switch of a remote control, which typically does not switch the television fully off, but allows certain circuitry within the television to remain powered, so that if the 'on' button of the remote control is pressed, the television will return to the 'on' mode.

There is a need to reduce the power consumed by the SMPS during standby mode, so that use of mains electricity is reduced. At present there is a goal to reduce the power consumption during standby mode to a value of the order of 1 Watt.

Burst mode SPMS are known, which have an efficient power consumption in standby mode. However the PWM control apparatus are not easy to implement for burst-mode SMPS, they generate much noise due to the 'burst' nature of their operation, and they require a large number of connections and external components, leading to a semiconductor package having many connection pins, and a large printed circuit board with many components.

Therefore what is needed is PWM control apparatus for SMPS with a reduced number of discrete components, a reduced pin count and size, and low power consumption in standby mode.

This invention seeks to provide a power supply which mitigates the above mentioned disadvantages.

SUMMARY OF THE INVENTION

According to the present invention there is provided a PWM control apparatus as claimed in claim 1.

In this way a PWM control apparatus for a SMPS is provided with a reduced number of discrete components, a reduced pin count and size, and a low power consumption in standby mode.

BRIEF DESCRIPTION OF THE DRAWING(S)

An exemplary embodiment of the invention will now be described with reference to the drawing in which.

DETAILED DESCRIPTION OF A PREFERRED EMBODIMENT

Figure 1:
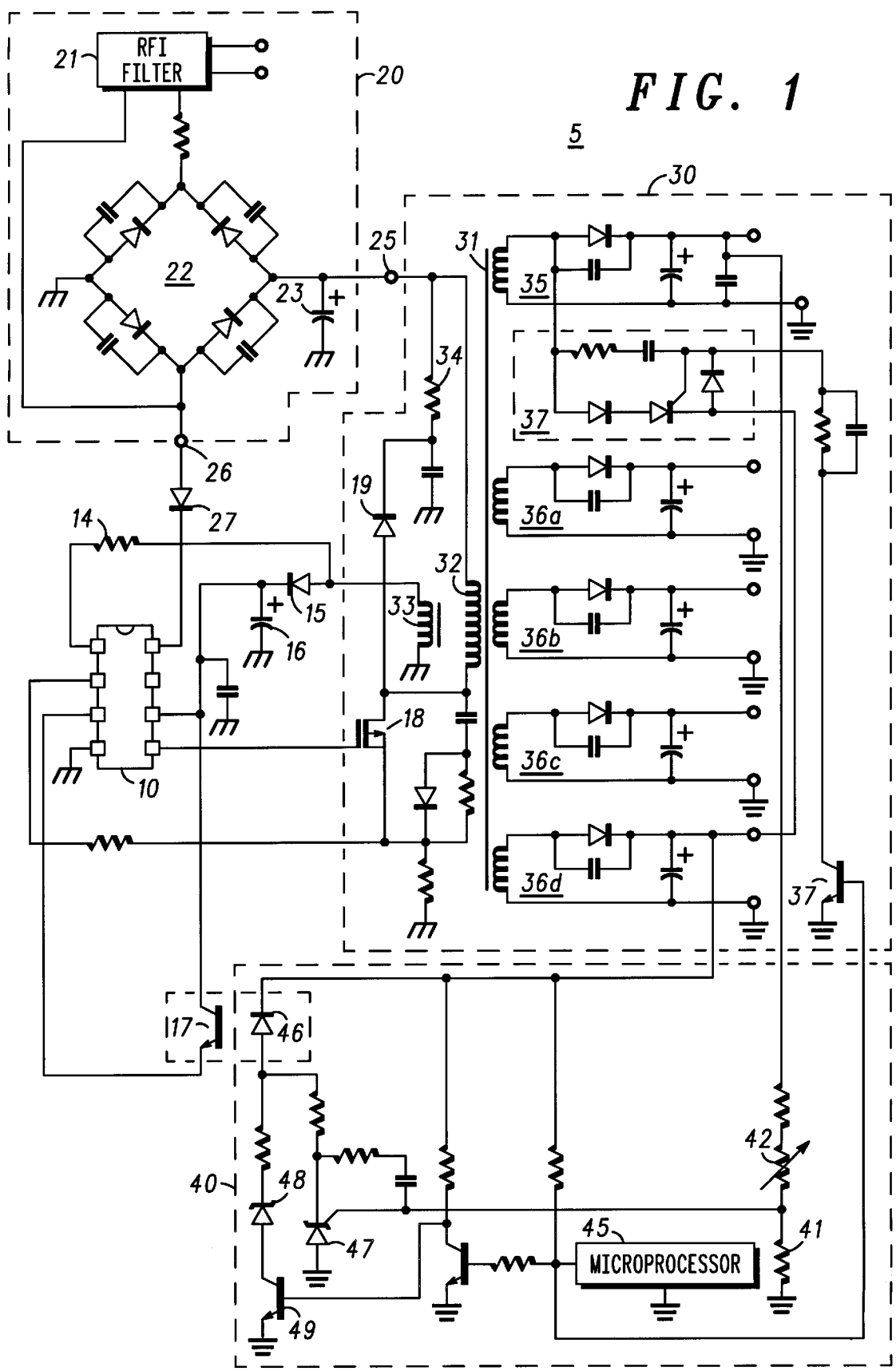
FIG. 1 shows a preferred embodiment of a switched-mode power supply in accordance with the invention.

Referring to FIG. 1, there is shown a switched-mode power supply arrangement (SMPS) 5, as might be found in a domestic appliance requiring a high-voltage supply, such as a television. A typical domestic appliance of this nature may include the feature of a standby mode of operation, whereby the appliance remains switched on, but with reduced functionality and reduced power consumption. The SMPS arrangement 5 includes a PWM control circuit 10, a mains supply arrangement 20, a transformer arrangement 30 and a microprocessor and regulation arrangement 40.

The PWM control circuit 10, which will be further described with reference to FIG. 2 below, is integrated as a semiconductor package having 8 connection pins.

The mains supply arrangement comprises a filter 21, a diode bridge 22 and a bulk capacitor 23 arranged to provide a rectified signal to a node 25. A further node 26 provides a signal directly from the filter 21 to pin 8 of the PWM control circuit 10, via a diode 27.

The transformer arrangement 30 has a magnetic core 31, and a primary winding 32 and an auxiliary winding 33 arranged on one side of the core. The primary winding 32 has one node coupled to the node 25, and a further node coupled to a clamping transistor 18 to be further described below. The auxiliary winding has one node coupled to ground and a further node coupled to pins 1 and 6 of PWM control circuit 10 via a resistor 14, and a diode 15 with storage capacitor 16 respectively.

A high-voltage secondary winding 35 and a low-voltage secondary windings 36a, b, c and d are arranged on the other side of the core. The high voltage winding 35 is arranged to provide a high voltage supply (~100 V) to appropriate high voltage components of the appliance (not shown) during normal mode of operation. The low voltage windings 36a, b c and d are arranged to provide low voltage supplies (~10 V) to various low voltage components of the appliance. Secondary winding 36d is coupled to provide a low voltage supply for the microprocessor and regulation arrangement 40, which is also provided for regulation purposes, to be further described below.

The microprocessor and regulation arrangement 40 has a microprocessor 45 arranged to control the management of the standby mode (and normal mode) of operation of the SMPS, in addition to other functions (not shown). When the power supplied to the secondary side of the transformer arrangement 30 has reached the desired level, regulation is achieved via an optocoupler arrangement in series with a regulating diode 47.

The breakdown voltage of the regulating diode 47 is adjustable via a potential divider circuit of resistor 41 and output level variable resistor 42, coupled to the output of the high voltage winding 35. In this way the regulating diode conducts a current according to the voltage obtained by the resistor divider arrangement of resistor 41 and output level variable resistor 42. This current flows through a Light Emitting Diode (LED) 46 of the optocoupler arrangement, inducing a signal in a photovoltaic cell 17 thereof. The photovoltaic cell is coupled between the storage capacitor 16 and pin 3 of the PWM control circuit 10.

When the PWM control circuit 10 receives a regulation signal from the photovoltaic cell 17 via pin 3, a signal is from pin 5 of the circuit 10 turns on a clamping transistor 18, which clamps both nodes of the primary winding 32 to the node 25, via clamping network of diode 19 and resistor 34. In this way the clamping transistor 18 acts as a power switch.

When the appliance switches to standby mode, the high voltage components of the appliance no longer require power. The microprocessor 45 reconfigures the secondary windings of the transformer arrangement 30 by turning on a transistor 37 which effectively clamps the high voltage winding 35 to a rectified voltage of the secondary winding 36*d* via the diode arrangement 37. The microprocessor also turns on a transistor 49, which effectively inserts a second zener diode 48 into the path of the LED 46, thus providing a means of regulation in standby mode, the rectified voltage of secondary winding 36*d* being forced not to exceed the sum of: the breakdown value of the regulating diode 47 plus the voltage drop across the LED 46 and the transistor 49.

Figure 2:
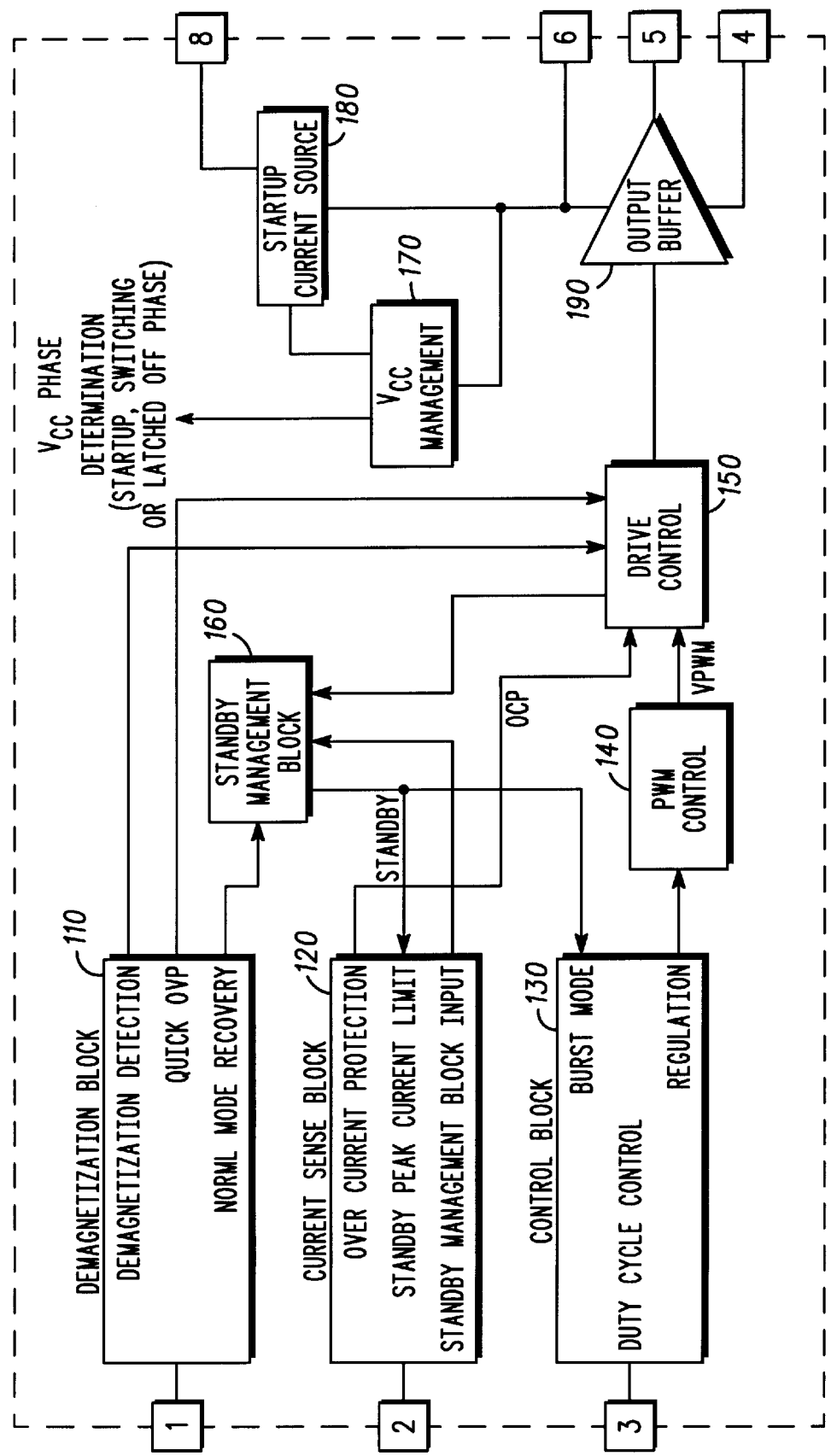
FIG. 2 shows a block diagram of a PWM control circuit forming part of the switched-mode power supply of FIG. 1.

Referring now also to FIG. 2, there is shown a block diagram of the PWM control circuit 10. Essentially, three control pins, pins 1, 2 and 3 provide inputs for all of the required variable signals used to control the SMPS. Pin 1 accommodates a zero current detection input and a negative voltage clamp. Pin 2 combines over-current protection with a standby peak current limit value. Pin 3 combines the current sense voltage (regulation) input with standby regulation.

The remaining pins provide supply and output connections: Pin 4 is coupled to ground, pin 5 drives the power switch arrangement of clamping transistor 18, pin 6 is coupled to the auxiliary winding 33 via the storage capacitor 16 (Vcc), and pin 8 is coupled to node 26 of the mains supply arrangement 20 (high voltage). Pin 7 is left unconnected, in order to improve isolation between pins 8 (high voltage) and 6 (Vcc).

Regulation is provided in the following way. The control block 130 is coupled to receive the regulation signal from pin 3. This is used to inform the drive control block 150, via the PWM control block 140, of the desired duty cycle of the output, which is then used to drive the output buffer 190 accordingly to control the power switch arrangement of clamping transistor 18.

Standby mode and normal mode are detected by the standby management block, which takes inputs from the demagnetisation block 110 (pin 1), the current sense block 120 (pin 2), and from the control block 130 (pin 3 via the drive control block 150). The mode detection is to be further described below with reference to FIG. 5.

When standby mode commences, the microprocessor 45 reconfigures the secondary side of the transformer arrangement 30 as described above. Due to the reconfiguration of the transformer arrangement 30 the regulation signal Vpwm will effectively regulate the high-voltage winding 35 to a voltage level in the order of 10 V. The voltages of all of the secondary windings will be reduced, which in turn causes the current developed in the auxiliary winding 33 to drop below that required to maintain power to the control circuit 10. At this time power is drained from the bulk capacitor 16 which causes Vcc to fall slowly.

Figure 3:
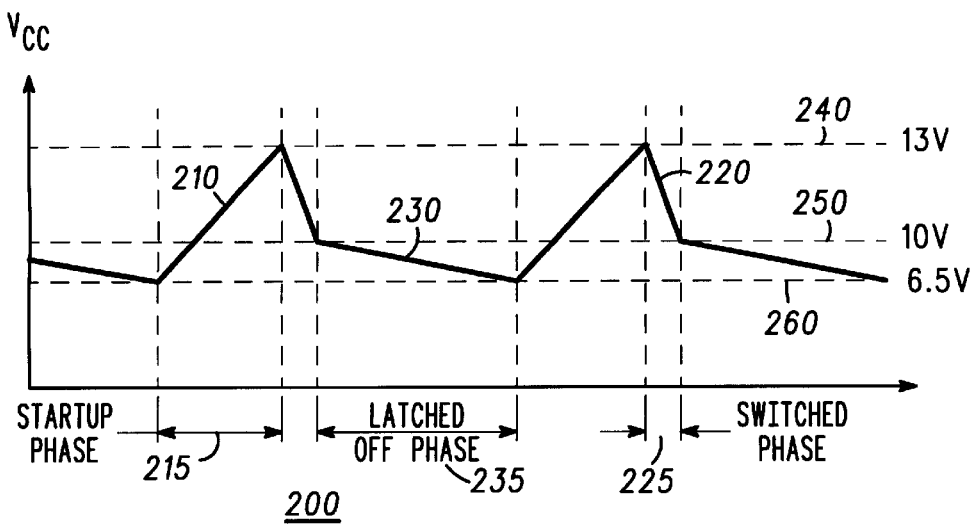
FIG. 3 shows a graph illustrating operating phases of the PWM control circuit of FIG. 2.

Referring now also to FIG. 3, there is shown a graph illustrating three operating phases of the PWM control circuit 10, in terms of the behaviour of Vcc during standby mode.

In a first phase (so-called start-up phase) 215, insufficient current is provided by the auxiliary winding 33 to power the PWM control circuit 10. Leading to Vcc being below a second undervoltage level 260, to be further described below (for example when the arrangement is turned on, or in standby mode as described in the preceding paragraph). During this first phase 210, the start-up current source 180 draws current directly from the filter 21 via the node 26 and diode 27, and supplies the current to the storage capacitor 16 which causes Vcc to rise steadily during this phase (line 210) until Vcc reaches a start-up threshold 240 (determined and detected within the Vcc management block 170).

In a second phase (so-called working phase) 225, the PWM control circuit 10 operates normally, drawing current from Vcc. (if the arrangement is in normal mode, Vcc would stay at or above the first undervoltage level 250, and the circuit 10 would continue operating normally). In standby mode, Vcc drops due to the insufficient current developed from the auxiliary winding 33 (line 220), until Vcc reaches a a first under-voltage level 250.

In a third phase (so-called latched-off phase) 235, the PWM control circuit 10 is switched off, as is the start-up current source 120. Thus in this third phase, very little current is drawn from Vcc, and Vcc therefore falls only very slowly, until it reaches the second under-voltage level 260, whereupon the start-up current source is again turned on, reverting again to the first phase 215.

The first, second and third phases 215, 225 and 235 respectively, are controlled by the Vcc management block 170, which produces signals indicating the phases as they occur.

Figure 4:
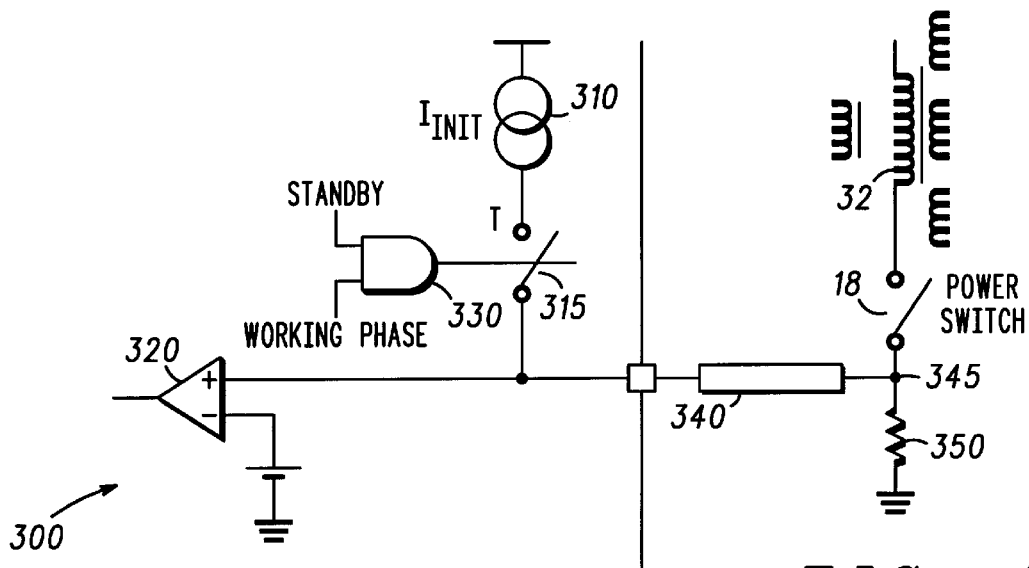
FIG. 4 shows an illustrative block diagram of two functions combined in a single pin of the PWM control circuit of FIG. 2.

Referring now also to FIG. 4, there is shown an illustrative block diagram of an over-current limit function of the PWM control circuit 10. Pin 2 is coupled to a non-inverting input of a comparator 320, and to a current source 310 via a switch 315. An inverting input of the comparator 320 is arranged to receive an over-current protection threshold voltage. In this way, should the voltage at pin 2 exceed the threshold voltage, the output of the comparator will generate a signal, indicating an over current condition.

Pin 2 is further coupled via a first resistor 340 to a point of divided potential 345. The point of divided potential 345 is coupled between the primary winding 32 via the power switch (clamping transistor 18), and ground via second resistor 350.

The switch 315 is switched in dependence upon the output of an AND gate 330, which is coupled to receive standby and working phase input signals. Therefore, in the event that the circuit 10 is in standby mode, the current source 310 is switched to be coupled to pin 2, thereby introducing a further current source to drain current via the second resistor 350 and the first resistor 340, thereby raising the voltage at pin 2. In this way, during standby mode, the over-current protection threshold is effectively reduced (by artificially raising the voltage at pin 2) and may be programmed by the value of the first resistor 340. The first resistor 340 may be partially or totally integrated with the PWM control circuit 10.

Figure 5:
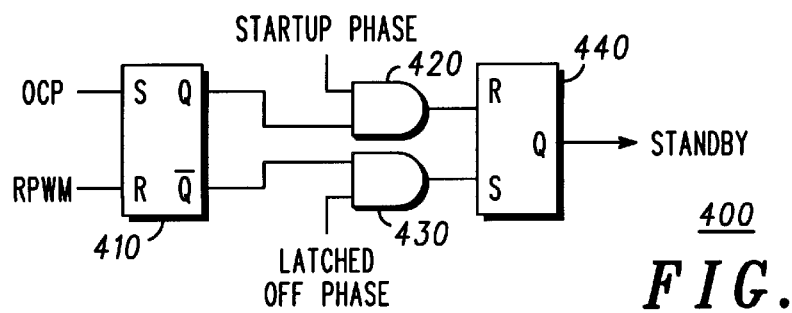
FIG. 5 shows an illustrative block diagram of a mode selection function using two pins of the PWM control circuit of FIG. 2.

Referring now also to FIG. 5, there is shown a latch arrangement 400 forming part of the standby block, and having first and second latches 410 and 440 respectively, and first and second AND gates 420 and 430 respectively.

The first latch 410 is set by an over-current signal derived from the Current sense block 120, and reset by a regulation signal (Rpwm) derived from the control block 130 and the PWM control block 140. Rpwm is a pulse signal which terminates the supply of power during normal mode steady-state.

The value of the first latch 410 is clocked to the first AND gate 420, which also receives a start-up phase signal from the Vcc management block 170.

The inverted value of the first latch 410 is clocked to the second AND gate 430, which also receives a latched-off phase signal from the Vcc management block 170.

The second latch 440 is set by an output of the second AND gate 430, and reset by an output of the first AND gate 420.

The determination of standby mode is performed in the following way. A latched-off phase 235 will occur if Vcc decays below the first under-voltage level 250, which is caused by insufficient power developed in the auxiliary winding 33. There are two possible reasons for this:

a) A fault condition (for example an overload) has occurred, causing the controller 10 to effectively switch off the SMPS.

b) Standby mode has been entered by the microprocessor 45 as described above.

In the latter case, a regulation signal will have been received at the end of the working phase 225, due to the excel voltage present at the moment of reconfiguration. Therefore the first latch 410 will have a low value, its inverted output will be high, as will the two inputs to the second AND gate 430, resulting in the second latch 440 being set, thus indicating standby mode.

Similarly the determination of normal mode is performed in the following way. Assuming that the PWM control circuit 10 is already in standby mode, the current source 310 will be switched on, effectively reducing the voltage threshold level of the comparator 320. Therefore when the microprocessor 45 decides to re-enter normal mode, and reconfigures the secondary windings accordingly, a large amount of current will then be demanded. This will lead to successive on-time terminated by the over-current protection (with an over-current protection signal) and no regulation (therefore no regulation signals) at the end of the switching phase. In this way the first latch 410 will be latched with a high value, and consequently the output of the first AND gate 420 will be high during the next start-up phase. This leads to the second latch 440 being reset, effectively cancelling the standby mode within the PWM control circuit 10, and returning to normal mode.

It will be appreciated that alternative embodiments to the one described above are possible. For example, this arrangement could be used with any type of SMPS, with fixed or variable frequency, and with current or voltage modes. The precise arrangement of the SMPS may differ from that described, whilst still allowing the PWM control circuit 10 to operate substantially as described.

The microprocessor and regulation arrangement 40 could differ in implementation from that described. For example, the regulating diode 47 could be replaced with an operational amplifier.

Furthermore, the latch arrangement 400 may be replaced by an alternative logic arrangement implementing substantially the same function. For example, the first AND gate 420 could be arranged to receive the latched-off phase signal, and the second AND gate would then receive the start-up signal, with an appropriate change to the operation of the latches.

What is claimed is:

1. Pulse Width Modulation control apparatus for use with a switched-mode power supply having a normal mode and a standby mode, comprising:

a first input arranged to receive a signal indicating an amount of current supplied by the supply;

over-current determining means coupled to the first input for providing an over-current signal in the event of there being an over-current condition in the signal indicating the amount of current supplied by the supply;

a second input arranged to receive a regulation signal in the event of there being a regulation output from circuitry coupled to receive power from the power supply, and logic means for comparing the over-current signal and the regulation signal in order to determine whether the switched-mode power supply is in standby mode or normal mode.

2. The pulse width modulation control apparatus of claim 1 further comprising means for determining the state of a operating supply voltage to the apparatus, wherein the logic means is further arranged to receive a signal indicating the state of the operating supply voltage, for use in determining whether the switched-mode power supply is in standby mode or normal mode.

3. The pulse width modulation control apparatus of claim 1 wherein the logic means comprises latch means arranged to latch the over-current and regulation signals.

4. The pulse width modulation control apparatus of claim 1 further including a selectively switchable current source coupled to the first input wherein during standby mode, the switchable current source is switched to increase the voltage at the first input, thereby reducing a threshold level for the over-current condition.

5. The pulse width modulation control apparatus of claim 1 having three control pins.

6. The pulse width modulation control apparatus of claim 1, encapsulated in an 8-pin plastic package.

7. The pulse width modulation control apparatus of claim 6, wherein one pin is provided to improve isolation between two power supply pins.

* * * * *